United States Patent [19]
Kilambi et al.

[11] Patent Number: 6,086,769
[45] Date of Patent: Jul. 11, 2000

[54] SUPPORTED LIQUID MEMBRANE SEPARATION

[75] Inventors: Srinivas Kilambi, Marietta, Ga.; Bruce A. Moyer, Oak Ridge, Tenn.; R. Bruce Robinson, Knoxville, Tenn.; Peter V. Bonnesen, Knoxville, Tenn.

[73] Assignees: Commodore Separation Technologies, Inc., Kennesaw, Ga.; Lockheed Martin Energy Research Corporation, Oak Ridge; The University of Tennessee Research Corporation, Knoxville, both of Tenn.

[21] Appl. No.: 08/929,078

[22] Filed: Sep. 15, 1997

Related U.S. Application Data

[63] Continuation-in-part of application No. PCT/US97/07451, May 2, 1997
[60] Provisional application No. 60/026,196, Sep. 16, 1996.

[51] Int. Cl.$^7$ .................................................. B01D 61/38
[52] U.S. Cl. .................................... 210/638; 210/643
[58] Field of Search .................... 210/638, 634, 210/643

[56] References Cited

U.S. PATENT DOCUMENTS

| | | | |
|---|---|---|---|
| Re. 26,097 | 10/1966 | Michaels | 210/321 |
| 3,173,867 | 3/1965 | Michaels | 210/321.74 |
| 3,808,267 | 4/1974 | David et al. | 260/527 |
| 4,174,374 | 11/1979 | Matson | 423/232 |
| 4,259,189 | 3/1981 | Li | 260/29.6 |
| 4,289,623 | 9/1981 | Lee | 210/247 |
| 4,400,296 | 8/1983 | Batzer et al. | 252/364 |
| 4,430,219 | 2/1984 | Kuzumoto | 210/321.3 |
| 4,477,377 | 10/1984 | Izatt et al. | 252/631 |
| 4,523,994 | 6/1985 | Shono | 210/643 |
| 4,542,010 | 9/1985 | Roman et al. | 423/579 |
| 4,592,973 | 6/1986 | Pemsler et al. | 429/206 |
| 4,617,125 | 10/1986 | Danesi | 210/638 |
| 4,661,257 | 4/1987 | Kreevoy et al. | 210/638 |
| 4,664,257 | 5/1987 | Nilson | 206/219 |

(List continued on next page.)

FOREIGN PATENT DOCUMENTS

| | | |
|---|---|---|
| 0 554 567 | 8/1993 | European Pat. Off. . |
| 2601098 | 7/1976 | Germany . |
| 3633523 | 2/1986 | Germany . |
| 52-114584 | 4/1976 | Japan . |
| 62-69158 | 3/1987 | Japan . |
| 1-155993 | 6/1989 | Japan . |
| 5-48859 | 7/1993 | Japan . |
| 2144652 | 3/1995 | United Kingdom . |
| WO 97/40904 | 11/1997 | WIPO . |

OTHER PUBLICATIONS

Kalachev, et al., "Facilitated Diffusion In Immobilized Liquid Membranes: Experimental Verification Of The 'Jumping' Mechanism And Percolation Threshold In Membrane Transport," *Journal of Membrane Science*, vol. 75, pp. 1–5 (1992).

Chaudry, et al., "Transport of Mo(VI) Ions Through Tri–n–octylamine–Xylene Based Supported Liquid Membranes," *Separation Science and Technology*, vol. 25(3), pp. 263–291 (1990).

Chaudry, et al., Transport of Co(II) Ions Through Di(2–ethylhexyl) Phosphoric Acid–CCl4 Supported Liquid Membranes, *Separation Science and Technology*, vol. 25(11 & 12), pp. 1161–1174 (1990).

(List continued on next page.)

*Primary Examiner*—Ernest G. Therkorn
*Attorney, Agent, or Firm*—Jones & Askew, LLP

[57] ABSTRACT

The present invention comprises a supported liquid membrane carrier liquid with a dielectric constant between approximately 20 and 32, more particularly between 22 and 28, and preferably about 24, and the use of that carrier liquid in a supported liquid membrane device to extract one or more chemical species from a feed liquid. The invention further comprises such a device where a temperature gradient is maintained between any of the feed, carrier, or strip liquids. In another embodiment of the invention, any of the feed, carrier, or strip liquids are conditioned, for example, by passing the liquids through a purifier, or replacing lost carrier liquid. In another embodiment of the invention, two or more devices are connected in series or parallel.

1 Claim, 5 Drawing Sheets

U.S. PATENT DOCUMENTS

| | | | |
|---|---|---|---|
| 4,700,001 | 10/1987 | Tanaka et al. | 564/307 |
| 4,700,011 | 10/1987 | Pillsbury | 568/585 |
| 4,710,205 | 12/1987 | Deetz et al. | 55/158 |
| 4,732,673 | 3/1988 | Dagard | 210/247 |
| 4,737,309 | 4/1988 | Kreevoy et al. | 252/184 |
| 4,747,949 | 5/1988 | Barkey | 210/638 |
| 4,750,918 | 6/1988 | Sirkar | 55/16 |
| 4,781,889 | 11/1988 | Fukasawa et al. | 422/48 |
| 4,789,468 | 12/1988 | Sirkar | 210/137 |
| 4,816,407 | 3/1989 | Matson et al. | 435/287 |
| 4,822,491 | 4/1989 | Ostertag | 210/638 |
| 4,842,736 | 6/1989 | Bray | 210/321.61 |
| 4,851,124 | 7/1989 | Vandegrift et al. | 210/638 |
| 4,879,316 | 11/1989 | Alexandratos et al. | 521/27 |
| 4,921,612 | 5/1990 | Sirkar | 210/644 |
| 4,923,679 | 5/1990 | Fukasawa et al. | 422/48 |
| 4,929,259 | 5/1990 | Caskey | 55/158 |
| 4,942,023 | 7/1990 | De Schepper et al. | 423/22 |
| 4,944,882 | 7/1990 | Ray | 210/640 |
| 4,961,758 | 10/1990 | Dobitz et al. | 55/16 |
| 4,961,760 | 10/1990 | Caskey | 35/158 |
| 4,971,836 | 11/1990 | Fukasawa et al. | 427/235 |
| 4,973,434 | 11/1990 | Sirkar et al. | 264/4 |
| 4,994,189 | 2/1991 | Leighton et al. | 210/637 |
| 4,997,567 | 3/1991 | Messalem | 210/490 |
| 5,041,227 | 8/1991 | van Eikeren | 210/640 |
| 5,053,132 | 10/1991 | Sirkar | 210/500.23 |
| 5,080,795 | 1/1992 | Pirkle et al. | 210/643 |
| 5,089,122 | 2/1992 | Chmiel | 210/185 |
| 5,100,555 | 3/1992 | Matson et al. | 210/651 |
| 5,102,640 | 4/1992 | Schlapfer | 423/326 |
| 5,110,326 | 5/1992 | Sirkar et al. | 55/158 |
| 5,114,579 | 5/1992 | Takigawa et al. | 210/638 |
| 5,160,627 | 11/1992 | Cussler et al. | 210/639 |
| 5,167,823 | 12/1992 | Leighton et al. | 210/637 |
| 5,167,824 | 12/1992 | Cohen et al. | 210/638 |
| 5,169,529 | 12/1992 | Carroll et al. | 210/321.78 |
| 5,174,872 | 12/1992 | Scott et al. | 204/153.1 |
| 5,188,735 | 2/1993 | Delloye | 210/634 |
| 5,189,189 | 2/1993 | Misawa et al. | 554/194 |
| 5,190,656 | 3/1993 | Paul et al. | 210/643 |
| 5,190,660 | 3/1993 | Lindoy | 210/670 |
| 5,192,443 | 3/1993 | Delloye | 210/638 |
| 5,229,004 | 7/1993 | Skelland | 210/643 |
| 5,252,220 | 10/1993 | Coughlin | 210/644 |
| 5,254,258 | 10/1993 | Pirkle et al. | 210/643 |
| 5,263,409 | 11/1993 | van Eikeren | 99/534 |
| 5,284,584 | 2/1994 | Huang | 210/321.61 |
| 5,332,531 | 7/1994 | Horwitz | 588/20 |
| 5,443,731 | 8/1995 | Moyer et al. | 210/634 |
| 5,478,474 | 12/1995 | Katti et al. | 210/656 |
| 5,495,062 | 2/1996 | Abel et al. | 588/1 |
| 5,497,627 | 3/1996 | Heyduk et al. | 62/85 |
| 5,498,339 | 3/1996 | Creusen et al. | 210/644 |
| 5,507,949 | 4/1996 | Ho | 210/490 |
| 5,512,180 | 4/1996 | Ho | 210/643 |
| 5,516,968 | 5/1996 | Mouk et al. | 588/1 |
| 5,525,232 | 6/1996 | Veiro et al. | 210/638 |
| 5,559,278 | 9/1996 | Mouk et al. | 588/205 |
| 5,578,547 | 11/1996 | Sumners | 502/407 |
| 5,580,452 | 12/1996 | van Eikeren | 210/321.74 |
| 5,602,071 | 2/1997 | Sumners | 502/401 |
| 5,602,295 | 2/1997 | Abel et al. | 588/205 |
| 5,603,953 | 2/1997 | Herbig et al. | 424/473 |
| 5,607,591 | 3/1997 | Dozol | 210/643 |
| 5,613,238 | 3/1997 | Mouk et al. | 588/1 |
| 5,616,821 | 4/1997 | Mouk et al. | 570/177 |

OTHER PUBLICATIONS

Elhassadi, et al., "Effects of a Carrier and Its Diluent on the Transport of Metals Across Supported Liquid Membranes (SLM). I. Solubility Mechanism," *Separation Science and Technology*, 21(3), pp. 267–283 (1986).

Kilambi, et al. "Reclaiming Metals and Organics from Industrial Wastewaters," *Pollution Engineering*, pp. 46–48 (Aug. 1996).

Kametani, et al., "Heterocycles," *The Japan Instutute of Heterocyclic Chemistry*, vol. 30, No. 1, pp. 665–706 (1990).

Tsukube, H., "Double Armed Crown Ethers And Armed Macrocycles As A New Series Of Metal–Selective Reagents: A Review," *Talanta*, vol. 40, No. 9, pp. 1313–1324 (1993).

Akiba, et al., "Transport Of Uranium (Vi) Through A Supported Liquid Membrane Containing LIX 63," *Separation Science and Technology*, 18(9), pp. 831–841 (1983).

Cussler, E., "On The Limits of Facilitated Diffusion," *Journal of Membrane Science*, vol. 43, pp. 149–164 (1989).

Neplenbroek, et al., "Supported Liquid Membranes: Instability Effects," *Journal of Membrane Science*, vol. 67, pp. 121–132 (1992).

Guha, et al., "Heavy Metal Removal and Recovery By Contained Liquid Membrane Permeator," *AIChE Journal*, vol. 40, No. 7, pp. 1223–1237 (1994).

Zha, et al., "Effect Of Surface Tension Gradients On Stability Of Supported Liquid Membranes," *Journal of Membrane Science*, vol. 107, pp. 75–86 (1995).

Lamb, et al., "Characterization Of A Macrocycle–Mediated Dual Module Hollow Fiber Membrane Contactor For Making Cation Separations,." *Separation Science and Technology*, vol. 25(13–15), pp. 1407–1419 (1990).

Zha, et al., "Instability Mechanisms Of Supported Liquid Membranes In Phenol Transport Process," *Journal Of Membrane Science*, vol. 107, pp. 59–74 (1995).

Danesi, et al., "Some Observations Of The Performance Of Hollow–Fiber Supported Liquid Membranes for Co–Ni Separations," *Solvent Extraction and Ion Exchange*, vol. 4(1), pp. 149–164 (1986).

Brennan, et al. "Natural Gas Separation Using Supported Liquid Membranes," *AIChE Journal*, vol. 32, No. 9, pp. 1558–1560 (1986).

Danesi, P., "A Simplified Model For The Coupled Transport Of Metal Ions Through Hollow–Fiber Supported Liquid Membranes," *Journal of Membrane Science*, vol. 20, pp. 231–248 (1984).

de Haan, et al. "Extraction of Metal Ions From Wastewater Modeling Of The Mass Transfer In A Supported Liquid Membrane Process," *Journal of Membrane Science*, vol. 45, pp. 281–297 (1989).

DeBlay, P. et al., "Selection of Organic Phases for Optimal Stability and Efficiency of Flat–Sheet Supported Liquid Membranes," *Separation Science and Technology*, vol. 26(1), pp. 97–116 (1991).

Cavatorta, et al., "Local Mass Transfer for Tube Banks in Two–Phase Flow," *The Canadian Journal of Chemical Engineering*, vol. 72, pp. 50–55 (1994).

Dworzak, et al., "Pilot–Scale Evaluation of Supported Liquid Membrane Extraction," *Separation Science and Technology*, vol. 22(2&3), pp. 677–689 (1987).

Hill, et al., "Nuclear Waste Treatment by Means of Supported Liquid Membranes Containing Calixcrown 1 Compounds," *Journal of Inclusion Phenomena and Molecular Recognition in Chemistry*, vol. 19, pp. 399–408 (1994).

Izatt, et al. "Comparison of Bulk, Emulsion, Thin Sheet Supported, and Hollow Fiber Supported Liquid Membranes in Macrocycle–Mediated Cation Separations," *Separation Science and Technology*, vol. 23(12&13), pp. 1645–1658 (1988).

Kanungo, et al. "Coupled Transport of Zn(II) Through A Supported Liquid Membrane Containing Bis (2,4,4–Trimethyl Pentyl) Phosphinic Acid In Kerosene. I. A Model For The Rate Process Involving Binary And Ternary Complex Species," *Journal of Membrane Science*, vol. 105, pp. 217–226 (1995).

Kunungo, et al., "Coupled Transport Of Zn(II) Through A Supported Liquid Membrane Containing Bis (2,4,4–Trimethylpentyl) Phosphinic Acid In Kerosene. II Experimental Evaluation Of Model Equations For Rate Process Under Different Limiting Conditions," *Journal of Membrane Science*, vol. 105, pp. 227–235 (1995).

Loiacono, et al., "Metal Ion Separation and Concentration With Supported Liquid Membranes," *Journal of Membrane Science*, vol. 28, pp. 123–138 (1986).

Urtiaga, et al. "Internal Mass Transfer in Hollow Fiber Supported Liquid Membranes," *AIChE Journal*, vol. 39, No. 3, pp. 521–525 (1993).

Nakayama, et al. "Separation of Rare Earth Metals Using A Supported Liquid Membrane With DTPA," *Journal of Alloys and Compounds*, vol. 225, pp. 288–290 (1995).

Saito, T., "Selective Transport of Alkali and Alkaline Earth Metallic Ions Through A Supported Liquid Membrane Containing Tripentyl Phosphate as a Carrier," *Separation Science and Technology*, vol. 28(8), pp. 1629–1640 (1993).

van Straaten–Nijenhuis, et al. "Recueil Review," *Recl. Trav. Chim. Pays–Bas*, vol. 112, pp. 317–324 (1993).

Yashima, et al. Enantiomer Enrichment of Oxprenolol Through Cellulose Tris (3,5–dimethylphenylcarbamate) Membrane, *Journal of Applied Polymer Science*, vol. 54, pp. 1087–1091 (1994).

"Liquid Membranes: Chemical Applications," CRC Book, pp. 124–139 (undated).

Danesi, "Separation of Metal Species," pp. 860–893 (1985).

Noble, R., "Two–Dimensional Permeate Transport With Facilitated Transport Membranes," *Separation Science and Technology*, vol. 19(8&9), pp. 469–478 (1984).

Ohki, A., et al., "Transport of Iron and Cobalt Complex Ions Through Liquid Membrane Mediated By Methyltrioctylammonium Ion With The Aid of Redox Reaction," *Separation Science and Technology*, vol. 18(11), PP. 969–983 (1983). (Japanese).

Fujinawa, et al., "Development of a Long–Life Supported Liquid Membrane," *Chem. Research Inst. of Non–Aqueous Solutions*, Tohoku Univ. Sendai 980, pp. 159–165 (1989). (Japanese).

Nakano, et al., "A Method For Continuous Operation Of Supported Liquid Membranes," Department of Chemical Engineering, Nagoya Univ. Nagoya 464 undated.

Pearson, D., "Supported Liquid Membranes For Metal Extraction From Dilute Solutions," *Ion Exch. Memb.* Chpt. 4, pp. 55–73 (1983).

Schultz, J., "Carrier–Mediated Transport In Liquid–Liquid Membrane Systems," *Recent Developments in Separation Science*, pp. 243–260. (undated).

Bonnesen, et al., "Removal Of Technetium From Alkaline Nuclear–Waste Media By A Solvent–Extraction Process Using Crown Ethers," *Challenges and Innovations in the Management of Hazardous Waste*, VIP–52, pp. 192–202.

Gephart, et al., "Hankford Tank Clean Up: A Guide to Understanding the Technical Issues." PNL–10773 (1995). pp. 1–77.

Moyer, et. al., "Investigating The Solvent Extraction of Technetium (VII) From Alkaline Sodium Nitrate By Crown Ethers," NEA/P&T Report No. 13, pp. 1–12 (1995).

Bonnesen, et al., "Removal of Technetium from Alkaline Waste Media by a New Solvent Extraction Process," *Emerging Technologies in Hazardous Waste Management VI* (1994). pp. 1–16.

Bonnesen, et al., "Solvent Extraction of Technetium From Alkaline Waste Media Using Bis–4,4'(5')[tert–Butyl)Cyclohexano]–18–Crown–6," *Value Adding Through Solvent Extraction: Proceedings of ISEC*, pp. 229–304 (1996).

Bonnesen, et al., "Alkaline–Side Extraction of Technetium From Tank Waste Using Crown Ethers and Other Extractants," *ORNL/TM–13241* (1996). pp. 1–92.

Bonnesen, et al., "Solvent Extraction of Radionuclides from Aqueous Tank Waste," *Report PNNL–SA–27105*, Pacific Northwest National Lab, pp. 43–46 (1996).

Moyer, et al., "Physical Factors in Anion Separations," *Supramolecular Chemistry of Anions*, pp. 1–46, (undated).

Gokel, et al., "Comprehensive Supramolecular Chemistry," *Molecular Recognition: Receptors For Cationic Guests*, vol. 1, pp. 377–416 (1996).

Danesi, P. "Separation of Metal Species By Supported Liquid Membranes," *Separation Science and Technology*, vol. 19 (11&12), pp. 857–894 (1985).

Dozol, M., "Possible Applications Of Crown–Ethers To Metal Extraction Using Liquid Membrane Technology, A Literature Survey," Drdd Cen Cadarache 13108 St. Paul Lez Durance France, pp. 163–171. (undated).

Kilambi, S., "Facilitated Transport Of Sodium Perrhenate Across Supported Liquid Membranes," *A Dissertation Presented for the Doctor of Philosophy Degree*, The University of Tennessee, Knoxville, pp. 1–200 (1996).

Stolwijk, et al., "Crown Ether Mediated Transport: A Kinetic Study of Potassium Perchlorate Transport Through A Supported Liquid Membrane Containing Dibenzo–18–Crown–6," *Journal American Chemical Society*, vol. 109, pp. 7042–7047 (1987).

Bonnesen, et al., "Selective Resins for Sorption Of Technetium From Groundwater," *Recent Developments and Future Opportunities in Separations Technology*, vol. 2, pp. 294–299 (1995).

Brown, G., "Selective Sorption of Technetium from Groundwater," *Long–Lived Radionuclides–ESP*, pp. 39–42 1996).

Chiarizia, et al., "Removal of Inorganic Contaminants from Groundwater," *Environmental Remediation Chapter 2*, pp. 22–33 (1992).

Chiarizia, R. "Application of Supported Liquid Membranes For Removal of Nitrate, Technetium (VII) and Chromium (VI) From Groundwater," *Journal of Membrane Science*, vol. 55, pp. 39–64 (1991).

Neplenbroek, et al., "Nitrate Removal Using Supported Liquid Membranes: Transport Mechanism," *Journal of Membrane Science*, vol. 67, pp. 107–119 (1992).

Barnes, et al., "Rapid Optimization of Chemical Parameters Affecting Supported Liquid Membranes," *Separation Science and Technology*, vol. 30(5), pp. 751–776 (1995).

Chiarizia, "Stability of Supported Liquid Membranes Containing Longchain Aliphatic Amines As Carriers," *Journal of Membrane Science*, vol. 55, pp. 65–77 (1991).

Danesi, et al., "Origin and Significance of the Deviations From a Pseudo First Order Rate Law in the Coupled Transport of Metal Species Through Supported Liquid Membranes," *Journal of Membrane Science*, vol. 29, pp. 195–206 (1986).

Dozol, et al., "Stability of Flat Sheet Supported Liquid Membranes in the Transport of Radionuclides From Reprocessing Concentrate Solutions," *Journal of Membrane Science*, vol. 82, pp. 237–246 (1993).

Elhassadi, et al., "Effects of a Carrier and Its Diluent on the Transport of Metals Across Supported Liquid Membranes (SLM) II. Viscosity Effect," *Separation Science and Technology*, vol. 21(3), pp. 285–297 (1986).

Fabiani, et al., "Degradation of Supported Liquid Membranes Under An Osmotic Pressure Gradient," *Journal of Membrane Science*, vol. 30, pp. 97–104 (1987).

Goddard, et al., "Facilitated Transport via Carrier–Mediated Diffusion in Membranes: Part II. Mathematical Aspects and Analyses," *AIChE Journal*, vol. 20, No. 4, pp. 625–645 (1974).

Hill, et al., "Study of the Stability of Some Supported Liquid Membranes," *Journal of Membrane Science*, vol. 114, pp. 73–80 (1996).

Kilambi, et al., "Facilitated Transport of Portechnetate Across Supported Liquid Membranes (SLMs)," *American Chemical Society Division of Industrial & Engineering Chemistry*, Sep. 17–20, pp. 852–853 (1995).

Neplenbroek, et al., "Supported Liquid Membranes: Instability Effects," *Journal of Membrane Science*, vol. 67, pp. 121–132 (1992).

Plucinski, et al., "The Calculation of Permeation Rates Through Supported Liquid Membranes Based on the Kinetics of Liquid–Liquid Extraction," *Journal of Medicine Science*, vol. 39, pp. 43–59 (1988).

Takeuchi, et al., "Some Observations on the Stability of Supported Liquid Membranes," *Journal of Membrane Science*, vol. 34, pp. 19–31 (1987).

Way, et al., "Liquid Membrane Transport: A Survey," *Journal of Membrane Science*, vol. 12, pp. 239–259 (1982).

Wienk, et al., "Stabilization of Crown Ether Containing Supported Liquid Membranes," *Journal of American Chemical Society*, vol. 112, pp. 797–801 (1990).

Zha, et al., "Critical Displacement Pressure of a Supported Liquid Membrane," *Journal of Membrane Science*, vol. 75, pp. 69–80 (1992).

FIG. 4

SUPPORTED LIQUID MEMBRANE SEPARATION

CROSS-REFERENCE TO RELATED APPLICATIONS

The present application is a continuation-in-part of U.S. provisional application Ser. No. 60/026,196, filed Sep. 16, 1996, entitled "Facilitated Transport of Sodium Perrhenate Across Supported Liquid Membranes", incorporated by reference. The present application is also a continuation-in-part of PCT/US97/07451, filed May 2, 1997, entitled "Supported Liquid Membrane Separation", incorporated by reference.

FIELD OF THE INVENTION

The present invention is in the field of chemical extraction, and is more particularly in the field of chemical separation by supported liquid membranes.

BACKGROUND OF THE INVENTION

Liquid membrane separation has its origins in liquid-liquid extraction which involves extraction of a solute from a first liquid using a second liquid solvent that is essentially immiscible with the first liquid. A back extraction is then typically done in a separate apparatus to remove the solute from the second liquid. Liquid-liquid extraction can be carried out in a number of devices such as mixer settlers, packed towers, bubble tray columns, asymmetrical membranes, and supported liquid membranes. Of all of these types of liquid-liquid extraction, supported liquid membrane technology belongs to a separate category of extraction that involves the presence of a carrier that forms a reversible complex with the preselected chemical species of interest.

Although other types of liquid-liquid extractions can be carried out using membrane supports, such processes are clearly distinguishable from supported liquid membrane transport in that such methods lack the presence of a carrier that forms a reversible complex to facilitate transport of the preselected chemical species. Such processes do not involve the formation of a reversible chemical complex but rather the physical partitioning of the solute between the two immiscible liquids. As a result, the rate of transport is very slow as the transport involves no reaction to form a chemical complex. Fluxes are low and the devices tend to be large. To facilitate liquid-liquid contact while preserving membrane life, such devices typically use asymmetrical supports such as membranes that are hydrophilic on one side and hydrophobic on the other side or membranes in which a gradient of pore size and density are used.

Liquid membrane transport separation is an emerging technology where specific material species are transported selectively and rapidly across a liquid membrane. Though liquid membrane transport was discovered in the early 1970s, the bulk of experimental studies involving this technique has been carried out only in the last few years.

In spite of the success of supported liquid membrane techniques in the laboratory, very few pilot scale studies have been undertaken. The primary reason for this low utilization has been the low flux rates and membrane instability. The high surface area per unit volume of hollow fiber microporous support members has increased the flux rate to some extent but flux rate improvements are still necessary to achieve commercial utilization. An even greater problem is membrane instability which generally occurs because of the gradual loss of the liquid membrane to the liquids on each side of the membrane. Such loss can occur because of (1) the solubility of the carrier and its diluent in the feed and strip liquids or (2) capillary displacement as a result of an osmotic pressure differential between the two sides of the membrane due to solution pumping of the feed and strip liquids.

Liquid membrane instability is a prime causes for the slow commercialization of the process. Although considerable research has been conducted to determine the causes for membrane instability, a permanent remedial solution has yet to be found. Studies as to osmotic pressure differences, interfacial membrane-solution tension, and low critical surface tension of the polymer support have been inconclusive.

Generally supported liquid membrane instability is subdivided into (1) instability arising from loss of carrier liquid (extractant) from the membrane phase leading to a loss in permeability, or (2) a complete "break down," resulting in direct contact of the feed and strip liquids. Attempts have been made to explain the complete "break down" effect on the basis of the osmotic pressure gradients across the membrane. Feed and strip liquid transport increases with this gradient, and this transport induces a repulsion of the liquid membrane phase out of the pore of the support which causes the membrane to degrade (Fabani, C., et al., *J. Membrane Science*, vol. 30, p. 97, 1987). Fabani concluded that osmotic pressure differences play a significant role in determining membrane stability and, as a result of these osmotic pressure differences, the carrier liquid (extractant) and its diluent is washed from the pores of the membrane. In direct contradiction, Danesi, P.R., et al., *J. Phys. Chem.*, vol. 1, p. 1412 (1987) concluded that the "osmotic pressure model" was not responsible for membrane instability. He and Takeuchi, et al., *J. Membrane Science*, vol. 34, p. 19 (1987) postulated that this form of instability was due to the poor nature of the carrier liquid diluent and low carrier liquid/diluent feed and strip interfacial tensions.

Takeuchi (1987) also found that membrane instability increased with feed velocity and also with increasing hydrostatic pressure gradient across the membrane. Neplenbroeck (1987) concluded that membrane instability depended on the type of feed and strip liquids used and the molecular structure of the carrier. He concluded that there was no direct relation between viscosity of the carrier and diluent and membrane instability but rather that there was a connection with the interfacial tension of the carrier diluent and the feed and strip liquids. However, these relations are ambiguous leaving strong doubt that membrane instability is not caused by osmotic pressure differences.

Other researchers such as Chirazia (1990) and Takeuchi (1987) have suggested that the use of amines as membrane diluents leads to better stability when compared to aliphatic diluents, that the degree of amine solubility in feed and strip solutions contributes to membrane stability, that interfacial tension lowering at the carrier-diluent/feed solution and strip liquid interface increases membrane stability, that the use of polymers which can cross link the carrier to the support can increase membrane stability, that the use of hollow fiber modules rather than flat sheet modules and membrane support pore size has an effect on membrane stability, and that the surface tension of the support in relation to the carrier-diluent/feed and strip interfacial tensions affect membrane stability. Dozol, J.F., et al., *J. Memb. Sci.*, vol. 82, p. 237 (1993) suggested that the solvent solubility of the solvent and the simultaneous drop point of the membrane as proportional to the interfacial tension could effect membrane stability. They felt that the liquid membrane must have surface tension lower than the critical surface tension of the support. They also concluded that the carrier solution viscosity has no effect on membrane stability. In view of these significant differences as to the causes of liquid membrane instability and inconclusive experimental results, there are significant doubts in the minds of researchers regarding the real cause of membrane instability. As such, a viable solution to the membrane stability problem has yet to be found and commercialization of this technique has yet to be achieved.

SUMMARY OF THE INVENTION

The present invention comprises a supported liquid membrane carrier liquid with a dielectric constant between approximately 20 and 32, more particularly between 22 and 28, and preferably approximately 24, and the use of that carrier liquid in a supported liquid membrane device to extract one or more chemical species from a feed liquid. The invention further comprises such a device where a temperature gradient is maintained between any of the feed, carrier, or strip liquids. Preferably, any of the feed, carrier, or strip liquids are conditioned, for example, by passing the liquids through a purifier, or replacing lost carrier liquid.

In one embodiment of the invention where three devices are connected in series, the carrier liquid of one device contains an anion exchange carrier, the carrier liquid of another device contains a neutral exchange carrier, and the carrier liquid of the other device contains a cation exchange carrier.

In a further embodiment of the invention, where a second ion is transported from the feed liquid to the strip liquid along with the ion of interest, the second ion is removed from the strip liquid to promote further transport of the ion of interest.

The present invention also includes a device containing the stable supported liquid membrane of the present invention that can be used to rapidly and efficiently remove one or more chemical species from a liquid. Thus, the present invention is therefore useful in removing contaminants from waste fluids from industrial applications, for example, for removing and reusing nickel from aluminum anodizing processes. The present method and device are also useful in removing heavy metals from waste water and in removing organic molecules from a feed stream.

One feature of the present invention is the ability to separate a large anion from a mixture of the large anion and smaller anions in a feed stream. The preferred carrier for separation of the large anion is a crown ether. The largest of the anions in the feed solution associates with the crown ether and cation and is carried across the liquid membrane with the carrier and a cation. For example, the present invention provides a means for separating large anions such as, but not limited to, pertechnetate, perrhenate, permanganate, perchlorate, perbromate, periodate, iodide, tetracyanaurate, tetraphenylborate, benzoate, and picrate anions from feed solutions containing smaller anions. The process has been found to be particularly effective in separating radioactive anions such as pertechnetate ($TcO_4^-$) from radioactive wastes that often contain substantial amounts of nitrate ion. Technetium ($^{99}Tc$), a uranium fission product, is a waste material left over after reprocessing fuel rods for plutonium production. The U.S. Department of Energy currently has 1.8 tons of this waste, which has a half-life of over two hundred thousand years.

Chemical treatment involves the use of reactions to transform hazardous waste streams into less hazardous substances. Chemical treatment can be used to recover hazardous substances, which can then be put to good use. Because it can be employed to produce useful byproducts and environmentally acceptable residual effluents, chemical treatment is a far better method of waste management than disposal in a landfill.

Many different forms of chemical treatment are used in hazardous waste management. Chemical reactions are used to reduce wastes in volume, or to convert them to a less hazardous form. These methods include neutralization of acidic and alkaline waste streams, precipitation of heavy metals to form an insoluble salt, usually with caustic lime, and addition of water-soluble chemicals and polymers to waste waters to promote coagulation and flocculation of heavy metals. These processes are used to separate suspended solids from liquids when their normal sedimentation rates are too slow to be effective. Coagulation is the addition and rapid mixing of a coagulant to neutralize charges and collapse the colloidal particles so they can agglomerate and settle. Flocculation requires gentle agitation to allow bridging of the flocculant chemical between agglomerated colloidal particles, to form large, settleable agglomerates.

Another chemical treatment is the use of organic polymers called polyelectrolytes, which react with colloidal material in wastewater by neutralizing the charge, and bridging individual particles to form flocs. Finally, oxidation and reduction can be used to convert toxic pollutants to harmless or less toxic substances. Oxidation is a chemical reaction in which electrons are lost from a chemical compound.

However, all the above-cited methods of chemical treatment of wastes require large physical facilities, and large amounts of capital. Furthermore, one can end up with a huge volume of liquid, even after all treatment steps are carried out.

Another type of waste recovery technology, using what is known as supported liquid membranes (SLM), can be used to separate hazardous chemical species from waste streams. In an SLM device, a porous membrane soaked with a carrier liquid separates a feed stream and a strip liquid. The waste chemical is transported from the feed stream, through the carrier liquid in the membrane, to the strip liquid. This process very selectively removes a chemical from the feed stream, concentrates it in the strip liquid—and does it in one step. The feed stream and the strip liquid do not mix. The key is the thin membrane soaked with carrier liquid, which separates the feed stream and the strip liquid. Since the membrane is very thin, very little of the expensive carrier liquid is necessary, and the whole process can be very economical.

However, no one has figured out a way to make the membrane last very long, that is, stabilize the carrier liquid. Therefore, this technology, though hinting of great promise, has heretofore not been commercialized.

The present invention shows how to stabilize the carrier liquid.

Accordingly, it is an object of the invention to provide a stabilized supported liquid membrane.

It is yet another object of the present invention to provide a method and device that is capable of removing a preselected chemical species from a solution.

Another object of the present invention is to provide a stabilized supported liquid membrane device that can remove a preselected chemical species from a solution over a long period of time without having to replace the supported liquid membrane.

Another object of the present invention is to provide a stabilized supported liquid membrane device that is capable of removing two or more chemical species from a solution.

Accordingly, it is an object of this invention to provide a means for removing large anions such as radioactive pertechnetate from waste streams.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit and scope of the invention.

BRIEF DESCRIPTION OF THE DRAWINGS

FIG. 7 is an end view of the embodiment shown in FIG. 4.

DETAILED DESCRIPTION

In a supported, or immobilized, liquid membrane device, a carrier liquid film is immobilized within the pores of a porous membrane. This porous membrane serves only as a framework or supporting layer for the liquid film. These membranes can be prepared by impregnating a porous membrane, typically hydrophobic, with a suitable organic solvent.

Thus, the present invention comprises a supported liquid membrane carrier liquid with a dielectric constant between approximately 20 and 32, and the use of that carrier liquid in a supported liquid membrane device to extract a chemical species from a feed liquid. In other embodiments of the invention, the dielectric constant of the carrier liquid is between approximately 21 and 30 or between approximately 22 and 28, and in a further embodiment of the invention, the dielectric constant is approximately 24.

When the overall dielectric constant of the carrier and the diluent mixture is below about 20 there is very little flux but a stable membrane. The flux continues to improve to a dielectric constant of about 24 with little change in membrane stability. Although the flux continues to improve with increasing dielectric constant of the carrier fluid beyond a dielectric constant of about 28, membrane stability begins to deteriorate appreciably.

In another embodiment of the present invention, mass transfer flux is described by the following equation:

$$J = K(A_F - (K_{d2}/K_{d1})A_S)$$

$$K_{d1} = A_1/A_i$$

$$K_{d2} = A_2/A_{si}$$

Where:
- J is the mass transfer flux
- K is the overall mass transfer coefficient
- A is the activity coefficient of the species of interest in the feed solution
- $A_F$ is the activity coefficient of the bulk feed species of interest
- $A_{si}$ is the strip side interfacial concentration of the species of interest
- $A_s$ is the activity coefficient of the bulk side species of interest
- $A_1$ and $A_2$ are the activity coefficients of the bound species of interest at the feed and strip interfaces, respectively
- $K_d$ is the distribution coefficient.
- $K_{d2}/K_{d1}$ is the ratio of the distribution coefficient on the strip side to that on the feed side.

The ratio $K_{d2}/K_{d1}$ is preferably between approximately 1.0 and 0.0001, where $K_{d2}/K_{d1}$ is the ratio of the distribution coefficient on the strip side to the distribution coefficient on the feed side. In one embodiment of the invention, the ratio $K_{d2}/K_{d1}$ is between approximately 0.1 to 0.0001. In another embodiment of the invention, the ratio $K_{d2}/K_{d1}$ is approximately between 0.1 to 0.001. In another embodiment of the invention, the ratio $K_{d2}/K_{d1}$ is between approximately 0.25 and 0.5. In a preferred embodiment of the invention, the ratio $K_{d2}/K_{d1}$ is approximately 0.33.

In another embodiment of the invention, a companion ion that is transported from the feed liquid to the strip liquid along with the ion of interest is removed from the strip liquid, thereby increasing transport of the ion of interest from the feed liquid to the strip liquid. The companion ion can be removed by a variety of means well known to those of ordinary skill in the art. Examples of methods of removing a companion ion include, but are not limited to, ion exchange, solvent extraction, and precipitation.

Figure 1:
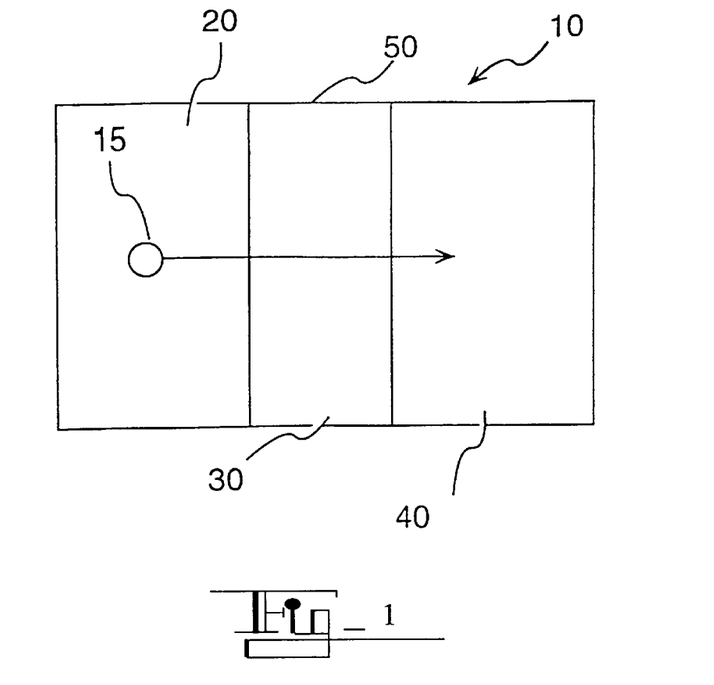
FIG. 1 illustrates a supported liquid membrane device including a carrier liquid in a microporous membrane, which separates a feed liquid and a strip liquid.

In use, the feed liquid contains a chemical species which is transported from the feed liquid through the carrier liquid in the pores of the membrane to the strip liquid (see FIG. 1). Two types of transport take place. In co-coupled transport, both a metal ion, for example, and its counter ion are transported from the feed solution through the supported liquid membrane (SLM) and into the strip solution. In coupled counter-transport, an acidic carrier, HC, loses a proton and forms a complex MC with the metal ion at the feed solution-SLM interface. This complex diffuses to the SLM-strip solution interface where it liberates the metal cation into the strip solution and simultaneously picks up a proton from the strip solution. The regenerated carrier HC diffuses back to the feed solution-SLM interface, picks up another metal ion and the process continues. The carrier molecule shuttles between the feed solution and the strip solution-SLM interfaces. The driving force in a counter-transport SLM is the pH differential between the feed and strip solutions.

A wide variety of materials can be used for the microporous liquid membrane support member, including hydrophobic materials such as microporous polypropylene [Celgard, Hoechst Celanese Corp., Fibers & Film Div., Charlotte N.C. 28209], Accurel® (Enka, A. G., Wuppertal), polytetrafluoroethylene [Gore-Tex: W. L. Gore & Associates, Inc., Newark Del. 19711], polyvinylidene fluoride, polystyrene, polyethylene, and hydrophilic materials such a microporous regenerated cellulose, cellulose acetate, cellulose acetate-nitrate cellulose triacetate, microporous glass and porcelain. Other materials, such as polybenzimidazoles, polysulfones, polyacrylonitriles, and silicon rubber, may also be used. Typically hydrophobic materials are used with organic liquid carriers, while hydrophilic materials are used with aqueous liquid carriers.

A chiral membrane may also be used to separate enantiomers. For example, a membrane of cellulose tris(3,5-dimethylphenylcarbamate) coated on Teflon may be used with the present invention. (See E. Yashima, et al., *J. of Applied Polymer Science*, vol. 54, pp. 1087–1091 (1994), incorporated by reference. All literature citations are expressly incorporated herein by reference.

Membranes may be treated to alter their surface properties. For example, hydrophobic films of polyethylene may be treated with chromic acid, sulfuric acid or oxidizing agents to render them less hydrophobic. Typically however, for organic carriers and diluents, untreated polypropylene is used that is symmetrical with respect to both sides and with respect to the density and size of the micropores. Support members can be in the form of flat sheets or desirably hollow fibers which provide a high ratio of membrane surface area to volume of feed solution and strip liquid. To further improve the membrane surface area in contact with the carrier liquid, a fabric of hollow fibers is helically or spirally wound about a central core.

The microporous liquid membrane support members of the present invention are generally about 20 to about 125 microns in thickness, and desirably about 25 to about 100 microns in thickness. However, it is to be realized that the support members should be as thin as possible consistent with the need to be strong enough to withstand pressure differences across the support member. Some feed solutions, carrier liquids, and strip liquids may cause the membrane support member to swell but this generally does not effect operation of the liquid membrane if the support member remains sufficiently strong. The diameters of the pores of the microporous liquid membrane support members range in size from about 0.01 to about 1 micron with a size of about 0.1 microns typically used. The pores are generally uniform in size and have a uniform density across the membrane.

The carrier liquid is generally composed of a diluent and a carrier selective for the chemical species of interest. For an aqueous feed solution, the carrier liquid is typically a water immiscible liquid organic solvent. When the feed solution is an organic solution, the carrier liquid is typically an aqueous-based system. It has been found that membrane stability is associated with the overall dielectric constant of the carrier liquid. It is desirable that the dielectric constant be in the range of about 15 to 32, preferably 20 to 28, or 21 to 28, and more particularly, about 24. The diluents listed below, when used within those dielectric parameters, have been found effective with the present invention.

To increase the viscosity of the carrier liquid, and so decrease loss of the carrier liquid, and at the same time not decrease diffusivity, one may add a small percentage of a high molecular weight polymer. This technique is described in U.S. Pat. No. 5,160,627 to E. L. Cussler, et al., incorporated by reference.

Appropriate diluents include aromatic hydrocarbons, aliphatic hydrocarbons, aldehydes, ketones, pyridines, ethers, crown ethers, nitrites, phosphoryls, or alcohols which are water immiscible and inert. Such diluents include aliphatic and aromatic hydrocarbons such as kerosenes (including aromatic and aliphatic ones), phenylcyclohexane, diphenylether, benzene, toluene, xylene, decane, dodecane, deconal, nitrophenyl ethers (nitrophenyl pentyl ether through nitrophenyl decyl ether), diisopropyl benzene, ortho-xylene, dodecane, 2-octanone, 4-(1-butylpentyl) pyridine, anisole, benzonitrile, tributylphosphate, 1-octanol, methyl isobutyl ketone, cyclohexanone, tri-n-butyl phosphate, nonylphenol, di-2-ethylhexyl phthalate, 1-octyl-2-pyrrolidone, Soltrol 220 (paraffin oil from Phillips Petroleum Co.), Isopar M (aliphatic isoparaffinic kerosene: Exxon Chemical Co., Houston, Tex.), and Isopar V. Typically membrane stability tends to improve when a carrier liquid that is extremely hydrophobic is used. However, such membranes, as typified by a long-chained, hydrophobic diluent such as dodecane, tend to produce very little flux because of the very low diffusion coefficients found in such diluents. On the other hand, polar solvents tend to afford high diffusion coefficients but have low stability. To balance these factors, it has been found desirable to balance the polarity of non-polar solvents with the polarity of a more polar solvent.

Most carrier and diluent combinations typically last less than about five days, e.g., nitrophenylpentyl ether in a typical supported liquid membrane configuration. Use of nitrophenyloctyl ether alone as a diluent, improves the lifetime to about 10–20 days. Pure dodecane as a diluent gives a membrane life of about five days. However when a mixture of nitrophenyl ethers is used, such as a 80:20 volume percent mixture of nitrophenyloctyl ether and nitrophenylpentyl ether, the supported liquid membrane lifetime increases unexpectedly to more than 90 days. By adding an alkane such as dodecane, the flux of the preselected chemical species through the membrane structure is further increased through the membrane while reducing diluent cost considerably. In one embodiment of the invention, the ratio of nitrophenyl ether to nitropentyl ether is 3:1 by volume.

Typically a diluent mixture of about 50–80 volume percent nitrophenyloctyl ether, about 5–20 volume percent nitrophenylpentyl ether, and about 5–50 volume percent dodecane can be used with about 60–70 volume percent nitrophenyloctyl ether, about 10–15 volume percent nitrophenylpentyl ether and about 15–30 volume percent dodecane preferred, and about 65 volume percent nitrophenyloctyl ether, about 15 volume percent nitrophenylpentyl ether and about 20 volume percent dodecane most preferred. It is to be realized that other nitrophenyl ethers may be substituted, such as nitrophenylhexyl ether for nitrophenylpentyl ether and other alkanes used, e.g., undecane and dodecane, with the present combination chosen on the basis of its stability, flux increase and low cost.

Suitable carriers include natural receptors, oximes, secondary and tertiary amines, macrocyclic polyethers, cobalt complexes, calixarenes, acidic organophosphorous compounds, carboxylic acids, and fatty acids. Examples of these compounds are valinomycin or beauverin, diethylhexylphosphoric acid, monododecylphosphoric acid, octaphenylphosphoric acid or bis(trimethylpentyl) phosphinic acid, and organophosphorous acid esters such as trioctylphosphine oxide, tributyl phosphate, and tripentyl phosphate, fatty acids such as oleic acid, dinonylnaphthalenesulfonic acid, 38% by weight of 2-hydroxy-5-nonylacetophenone oxime in kerosene available from Henkel Corp., Tucson, Ariz., as LIX84 (2-hydroxy-5-nonylacetophenone oxime), LIX 64N, LIX 860N, LIX 973N, LIX 984 (LIX 84 and LIX 984 combine an aldoxime and ketoxime in about a 1:1 mole ratio), uranyl salophene, Primene JM-T (a long-chain primary alkylamine from t-$C_{18}H_{37}NH_2$ to t-$C_{22}H_{45}NH_2$; Rohm & Haas), tetraoctyl ammonium bromide, trioctylmethyl ammonium chloride, dodecylamine, tridecylamine, tri-n-octylamine, triphenylamine, trioctylmethylammonium chloride, Amberlite-LA-2 (Rohm & Haas Chemical Co., Philadelphia, Pa.), Alamine 336 (a tertiary amine: General Mills, Inc., Minneapolis Minn. 55440), Aliquat 336 (methyltricaprylammonium chloride, a quaternary ammonium salt), alkylated cupferrons such as the ammonium salt of N-(alkylphenyl)-nitrosohydroxylamine, beta-hydroxyoximes, beta-diketones, alkylated ammonium salts such as tridoddecylammonium chloride, oligoamides such as malonamide and glutaramide, and compounds such as 4-octadecyoxybenzaldehyde, Cyanex 272 (di-(2,2,4-trimethylpentyl)phosphinic acid), Cyanex 302 (bis(2,4,4-trimethylpentyl)monothiophosphinic acid), Cyanex 301 (methylpentylphosphinodithioic acid) (American Cyanamid Co., Chemical Products Div., Wayne N.J. 07470), tri-n-octylphosphine oxide (TOPO) (Hokko Chemical Ind. Co. Ltd., Chuo-ku Tokyo, Japan), di-n-octyl sulfide, diethylcarbamoyl methyl phosphonate, n-octylphenyl N,N-diisobutylcarbamoyl methylphosphine oxide, dinonylnaphthalene sulfonic acid, N-methyl,N-butyl decanamide, N,N-di(n-octyl)hexanamide. Other suitable carriers are disclosed Wienck, M.M., et al., *J. Am. Chem. Soc.*, 1990, vol. 112, pp. 797–801; C. Hill, et al., *J. of Inclusion Phenomena and Molecular Recognition in Chemistry*, vol. 19, pp. 399–408, 1994; W. F. van Straaten-Nijenhuis, et al., *Recl. Trav. Chim. Pays-Bas*, vol. 112, pp. 317-324 (6 Jun., 1993); Nijenhuis, W. F., et al., *J. Am. Chem. Soc.*, vol. 113, p. 3607 (1991); W. F. van Straaten-Nijenhuis, et al., *J. Membr. Sci.*, vol. 82, p. 277 (1993); U.S. Pat. No. 4,879,316 to Alexandratos, Spiro D., et al.; U.S. Pat. No. 4,661,257 to Kreevoy, et al., U.S. Pat. No. 5,443,731 to Moyer, B. A., et al., all incorporated by reference.

Crown Ethers

Crown ethers may also be used as carriers. Useful crown ethers include: 12-crown-4, 13-crown-4, 14-crown-4, 15-crown-5, 16-crown-4, 16-crown-5, 18-crown-6, 19-crown-6, 20-crown-6, 21-crown-7, or 24-crown-8, which may have attached to them including but not limited to benzene rings (benzocrowns), cyclohexyl rings (cyclohexylcrowns), alkyl groups (e.g., t-butyl or t-octyl groups), or hydroxyl, ketone, ether, phosphoryl, sulfoxide, amide, or pyridine substituents. Other crown ethers include dicyclohexano- 18-crown-6, 4-tert-butylcyclohexano-15-crown-5 or bis-4,4 (5 ) [tert-butyl)cyclohexano-18-crown-6 from Parish Chemical Company (Vineyard, Utah), calix[4]crown-6, lariat ether amides, such as sym-dibenzo-16-crown-5-oxacetamide compounds. Typically a crown ether with lipophilic character is used as the carrier, since this property, namely, the tendency to remain in a solvent, is directly related to the stability of the liquid membrane. Such a property counteracts the slight but steady distribution of the carrier molecules into the strip and feed solutions over time, which eventually depletes the carrier from the liquid membrane. To improve the lipophilic character of a crown ether such as dicyclohexano-18-crown-6, hydrophobic groups such as aliphatic groups are added to the basic carbon framework of the crown ether. Typical aliphatic groups include t-butyl, t-octyl, n-octyl, 2-ethylhexyl, isooctyl, isodecyl, isotridecyl, decyl, and dodecyl.

Carriers such as dithizone may be used in separating metal ions such as cadmium, copper, lead, mercury, or zinc, while carriers such as thioxine may be used in separating metal ions such as antimony, arsenic, bismuth, cadmium, copper, cobalt, gallium, gold, indium, iridium, iron, lead, manganese, mercury, molybdenum, nickel, osmium, palladium, platinum, rhenium, rhodium, ruthenium, selenium, silver, tantalum, tellurium, thallium, tin, tungsten, vanadium, or zinc. Where it is desired to separate a neutral species such as an organic molecule, e.g., an aromatic hydrocarbon from a hydrocarbon feed solution, the carrier for such an aromatic hydrocarbon may be, e.g., polyethylene glycol and benzene.

To separate enantiomers from the feed stream, a chiral carrier may be used. Such carriers, such as (S)—N—(1-naphthyl)leucine octadecyl ester, are described in U.S. Pat. No. 5,080,795 to Pirkle, et al., incorporated herein by reference.

Although a carrier in liquid form may be used as the carrier liquid, preferably the carrier liquid used in the device and processes of the present invention will contain from about 2 to about 70 percent by weight of the carrier, more preferably from about 10 to 50 percent by weight of the carrier, and most preferably from about 30 to 45 percent by weight of the carrier.

The preferred carrier will depend upon the preselected chemical species. For example, for copper and neodymium ions or zinc and copper ions, the preferred carrier liquid includes the acidic organophosphorous compounds such as diethylhexylphosphoric acid or trilauryl ammonium chloride.

Typical cation exchangers include carriers such as long chain alkyl, sulfonic, carboxylic, phosphoric, phosphonic, and phosphinic acids, beta-diketones, and hydroxyoximes. Typical anion exchangers include carriers such as long chain alkylamines and their salts, phosphoric acid esters, and phosphine oxides while neutral carriers include crown ethers, phosphonates, and phosphine oxides. The crown ethers are typically dissolved in the diluent at concentrations ranging from about $1.0 \times 10^{-5}$ molar to about 5 molar, with about 0.1 to 1 molar being a typical concentration.

The carrier liquid may contain a surfactant. Suitable surfactants can assist in stabilizing the mixtures, i.e., reducing any tendency for the mixture to separate. The suitable surfactants are generally non-ionic surfactants with hydrophilicity-lipophilicity balance (HLB) numbers from about 8 to about 15, preferably from about 9 to about 10. Suitable surfactants include polyoxyalkylene, alkyl ethers, e.g., polyoxyethylene lauryl ether, polyoxyalkylene alkyl phenols, polyoxyalkylene esters, sorbitan esters such as polyoxyalkylene sorbitan esters, polyoxyalkylene sorbitan esters, and polyols. Such surfactants can generally be added in amounts of about 1 to about 40 percent by weight based on the total amount of carrier, diluent, and surfactant.

The carrier liquid can contain additional materials which improve its overall operation. These materials include pyridines, amines, amides, ethers, nitriles, sulfoxides, phosphoryl compounds including, for example, phosphine oxides and the alkyl esters of phosphoric, phosphonic, and phosphinic acids, fluorocarbons, and alcohols. Such added materials are typically present in the diluent at a concentration ranging from about 0.01 molar to about 2 molar, with about 1.0 molar being preferred. The typical volume percent of the added materials is about 0.5 to about 50 percent by volume.

Figure 2:
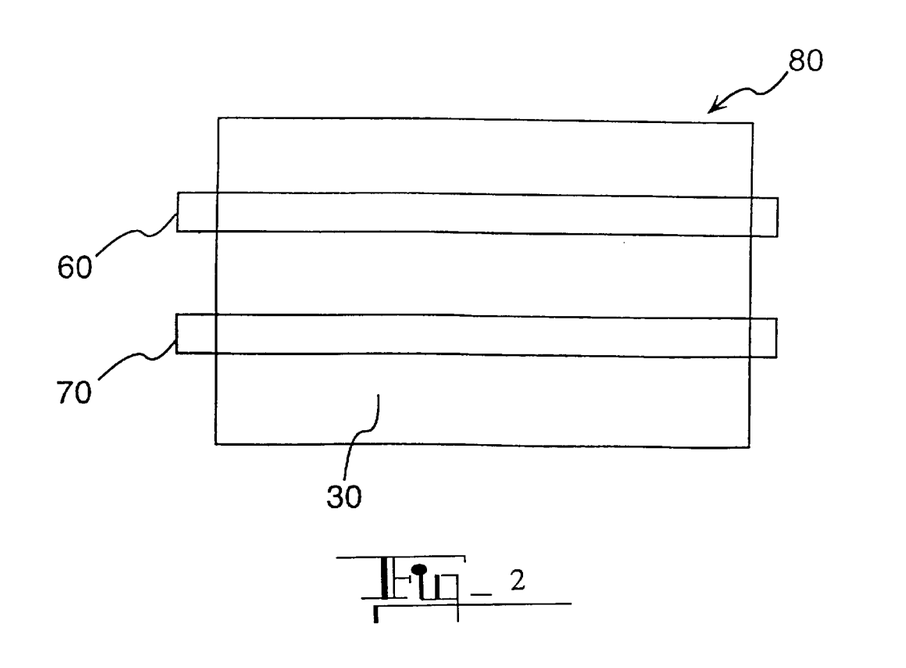
FIG. 2 illustrates a hollow fiber contained liquid membrane module with two hollow fibers, one fiber carrying the feed liquid the second fiber carrying the strip liquid where carrier liquid circulates between the fibers in the module.

In the operation of the device 10, a feed liquid 20 containing the chemical species of interest 15 flows past a microporous membrane 50 impregnated with the carrier liquid 30, and the species of interest is transported to the strip liquid 40 on the other side of the membrane (See FIG. 1). When the device 10 is a hollow fiber contained module (see FIG. 2), the feed liquid 20 flows through the feed liquid tube 60, the strip liquid 40 flows through the strip liquid tube 70, and the carrier liquid 30 circulates in the module 80 on the outside of tubes 60 and 70.

Several supported liquid membrane devices may be connected in series, where the strip stream of one device becomes the feed stream of the following device. To maintain the driving force for chemical separation, if, for example, three devices were in series, they would transport the chemical species of interest across the membrane as a neutral species, a cation, and an anion. Of course, any of those could be first, second, or third. Therefore, the carriers would be anionic, cationic, or neutral carriers. Examples of these carriers are listed below.

Separate strip cells, each with a different strip liquid, can be used to separate two or more chemical species from the feed liquid. When using a hollow fiber configuration, it is not necessary to use a barrier to form separate cells. Rather, when hollow fibers are employed, the feed solution flows through the interior of one set of fibers while separate strip liquids flow through individual bundles of strip fibers with the carrier liquid circulating on the outside of each bundle of fibers.

Furthermore, when a chemical ion of interest is transported along with along with a second ion to the strip side of the microporous membrane, removal of the second ion will actually increase transport of the ion of interest to the strip liquid. For example, $Na^+$ may be transported to the strip liquid along with $TcO_4^-$. Removal of the $Na^+$ and replacement with $Mg^{2+}$ to preserve ionic neutrality will unexpectedly increase transport of $TcO_4^-$.

A carrier liquid can be conditioned to improve the stability and operation of the supported liquid membrane device. This is accomplished by: (1) passing through a conditioner such as a purifier to remove impurities; (2) providing a supply of carrier liquid to replace lost carrier or diluent, or both; and (3) removing pre-selected ions when more than one pre-selected ion is chosen for separation using a device such as an ion exchange column. Purification can be accomplished by filters, sorption devices employing materials such as activated carbon, distillation apparatus, liquid-liquid extraction devices, ion exchangers and other means. One or more preselected species can be removed from the carrier liquid prior to passage to the strip liquid. Devices such as an ion exchanger, liquid-liquid extraction unit, sorption devices, distillation apparatus, and others can accomplish this.

Similarly, the feed solution and strip liquid may also have a conditioning step in which a conditioner is used to remove membrane fouling impurities, or add and remove various species from these liquids to improve the operation of the overall device and process including improvement of the flux of the pre-selected chemical species. Thus, removal of various species from the feed solution or strip liquid using such techniques as ion exchange, activated carbon processing, or reverse osmosis can improve significantly the flux of the preselected chemical species through the supported liquid membrane. Similarly addition of various chemical species including non-preselected species to either the feed solution or strip liquid can also improve preselected chemical transport across the supported liquid membrane. Such additions and removals are made so as to maintain an overall ionic strength differential across the support liquid membrane structure that results in improved distribution coefficients of the preselected chemical species at both the feed and strip side of the membrane structure and a resulting increase of preselected chemical species complex flux across the membrane.

The present invention contemplates the use of a wide variety of devices and methods for preparing the feed liquid so as to accommodate a wide variety of commercial applications, including, but not limited to, the cleanup of radioactive materials, contaminated soils, contaminated ground water, processing waste streams and other hazardous waste sites. Such preparation devices and methods include the use of supercritical solvents such as carbon dioxide or more conventional aqueous and organic solvent methods and devices, separation methods and devices including vacuum distillation devices to remove volatile substances including, but not limited to, organic vapors, perstraction devices and methods to separate on the basis of partial pressures, gas separators, concentrators, filters, and the like. Such techniques are especially attractive to the clean up of metals and organics at manufactured gas plants. As such the present invention contemplates multiple and simultaneous operation of a wide variety of pretreatment processing to prepare one or more feed solutions including both organic and aqueous feed streams of metals, aromatics such as benzene, toluene, ethyl benzene and xylene, and hydrocarbons.

The pH of an aqueous feed liquid can be varied depending upon the choice of the carrier. With carriers such as acidic organophosphorous compounds, organophosphorous acid esters, or beta-hydroxyoximes, the pH of the feedstream is generally within the range of about 3.0 to 6.0 and more preferably from about 4.0 to about 5.5. The pH of the strip liquid is generally within the range about 0.1 to about 2.0, more preferably from about 0.5 to about 1.0. The strip liquid can be an aqueous acidic solution, e.g., a nitric acid solution or other suitable acidic solution such as sulfuric acid. Some applications for metal transport may require extraction from basic solution, and complexing agents such as beta-diketones can be used with pH ranges greater than about 8.

Although the process and related device can be used at ambient temperatures or at higher or lower temperatures, a temperature gradient across the supported liquid membrane structure 20 (see FIG. 1) has been found often to be effective in increasing the flux of the preselected chemical species across the liquid membrane structure. This may be achieved by heating the feed liquid, the carrier liquid, the strip liquid, or a combination of two of the solutions. Electrical heating coils, boilers, heat exchangers, heating jackets, water/steam baths or other heating devices can be used. Cooling of the feed, carrier, or strip liquids, or a combination of any two, can be done with a chiller, a heat exchanger, dry ice/solvent bath or other cooling device. Alternatively, heating and cooling can be accomplished by heating or cooling the feed carrier or strip compartments directly, as for example by placing a heating element or heat exchanger directly into the feed, carrier or strip liquid compartments of the supported liquid membrane device. In certain situations it can be advantageous to heat or cool only the carrier liquid to establish the proper temperature gradient for the system.

Of course, various other process parameters must be considered in establishing the temperature gradient including the stability of materials in the feed solution including the preselected chemical species, the boiling points and volatility of the carrier and its diluents, and the cost of maintaining such gradients versus the decreased throughput times at ambient temperatures. Flux increases of about an order of magnitude are obtained when a 30–50 degree Celsius temperature gradient is maintained.

When using a hollow fiber contained liquid membrane device, the feed solution, carrier liquid, and strip solution may be maintained at flow rates of, for example, about 1 cm/sec to about 5 m/sec. The flow rate of a more viscous fluid may be maintained at a flow rate of 3–5 times that of a less viscous fluid. However, it is to be realized that such flows rates are not necessary to the practice of the invention and that a batch-type processing without feed, strip and carrier flows are contemplated as part of the present invention.

One feature of the present invention is the use of a crown ether carrier to separate a large anion from a mixture of the large anion and smaller anions in the feed solution. It has been found that when a crown ether is used as a carrier to carry a small cation across the membrane, the largest of the anions in the feed solution associates with the crown ether and cation and is carried across the liquid membrane with the carrier and cation. As a result it is possible to remove the largest of the anions from the feed, which gives the invention particular utility in separating large anions such as pertechnetate, perrhenate, permanganate, perchlorate, perbromate, periodate, iodide, tetracyanaurate, tetraphenylborate, benzoate, and picrate anions from feed solutions containing smaller anions. The process has been found to be particularly effective in separating radioactive anions such as pertechnetate from radioactive wastes that often contain substantial amounts of nitrate ion. For example, a crown ether carrier can form a cation complex with a sodium ion at the interface of the feed solution and the liquid membrane. To preserve charge neutrality with respect to the sodium cation and crown ether complex, and between the feed solution and the strip liquid, an anion also associates itself with the crown ether cation complex and is also transported to the interface of the strip solution and liquid membrane, where the complex dissociates with the anion and the cation, e.g., Na$^+$, entering the feed liquid. The crown ether then returns to the interface of the feed solution and the liquid membrane. Because the pertechnetate anion, $TcO_4^-$, is the largest anion in the feed solution, it is selectively carried across the liquid membrane, while the large nitrate anion, $NO_3^-$, because it is smaller than the pertechnetate anion, remains in the feed solution.

While not wanting to be bound by the following hypothesis, the mass transfer flux (J) is given by the equation of Dr. Srinivas Kilambi:

$$J = K(A_F - (K_{d2}/K_{d1})A_S)$$

$$K_{d1} = A_1/A_i$$

$$K_{d2} = A_2/A_{si}$$

Where:

J is the mass transfer flux

K is the overall mass transfer coefficient

A is the activity coefficient of the species of interest in the feed solution $A_F$ is the activity coefficient of the bulk feed species of interest $A_{si}$ is the activity coefficient of the strip side interfacial species of interest $A_s$ is the activity coefficient of the bulk side species of interest $A_1$ and $A_2$ are the activity coefficients of the bound species of interest at the feed and strip interfaces, respectively $K_d$ is the distribution coefficient.

Figure 3:
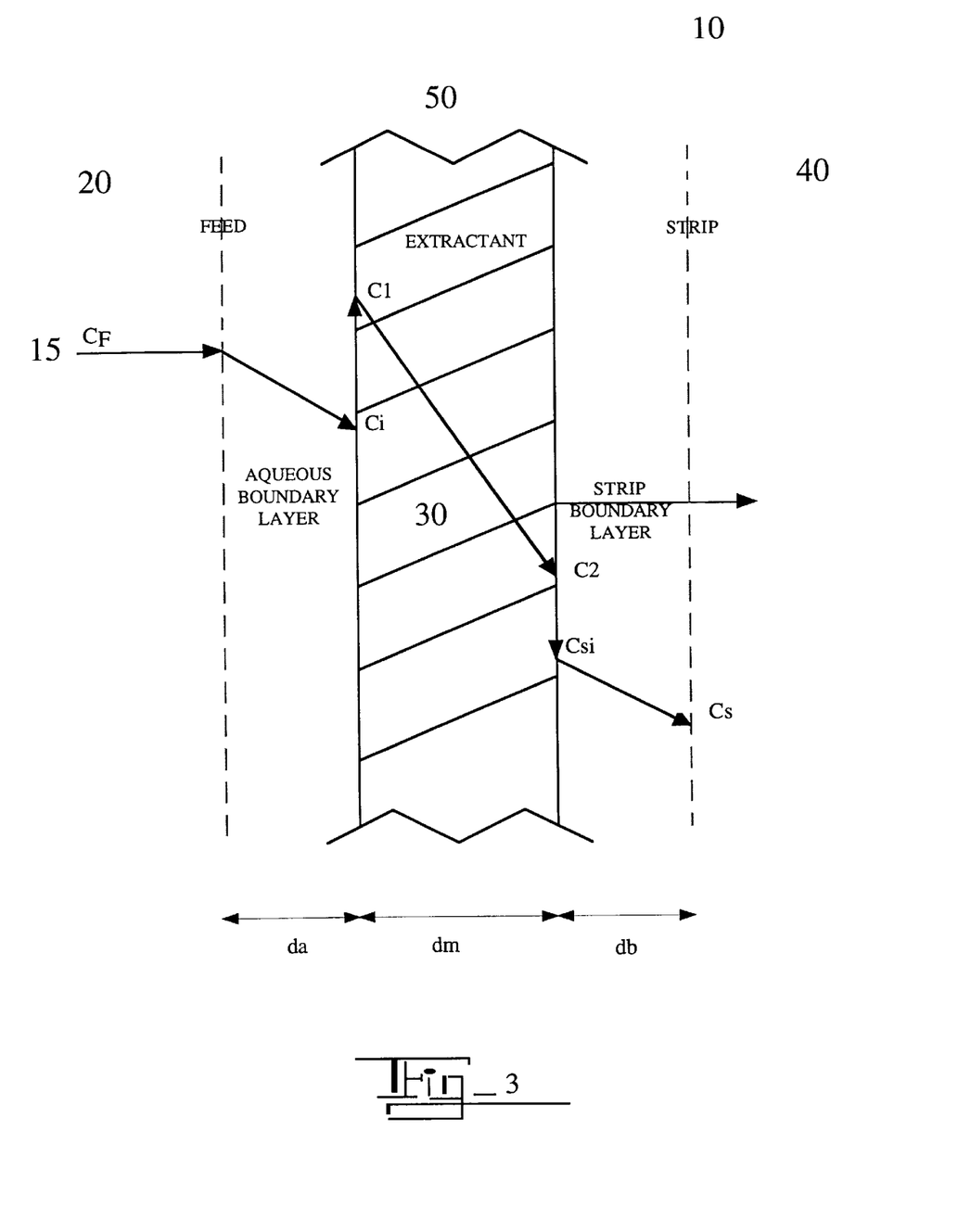
FIG. 3 is a schematic of the concentration profile across a supported liquid membrane.
Figure 4:
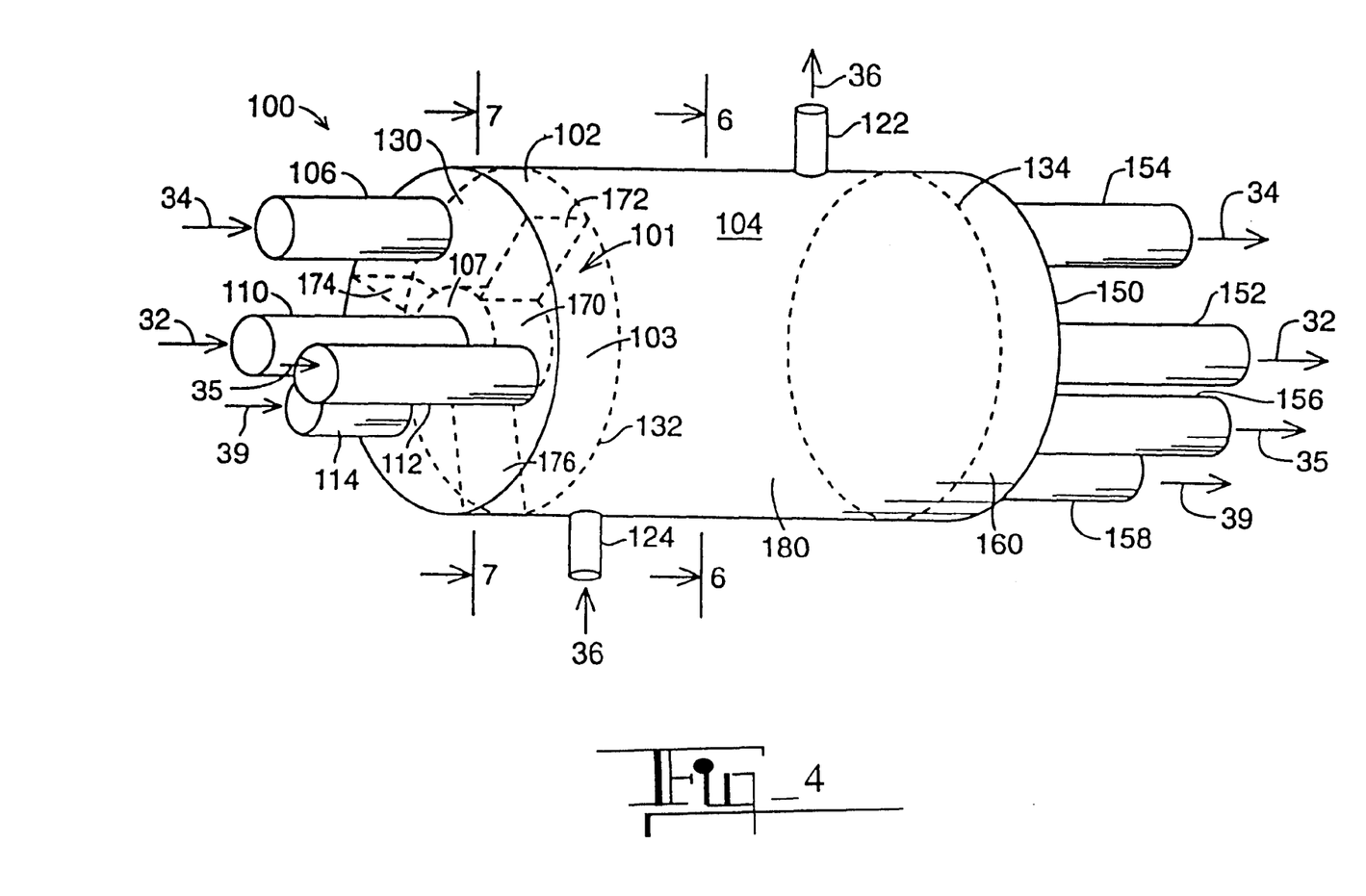
FIG. 4 is a perspective drawing showing a module featuring the use of hollow fibers and used for parallel processing of multiple strip liquids.

$K_{d2}/K_{d1}$ is the ratio of the distribution coefficient on the strip side to that on the feed side (See FIG. 3).

The ratio $K_{d2}/K_{d1}$ is preferably between approximately 1.0 and 0.0001, where $K_{d2}/K_{d1}$ is the ratio of the distribution coefficient on the strip side to the distribution coefficient on the feed side. In a further embodiment of the invention, the ratio $K_{d2}/K_{d1}$ is between approximately 0.1 to 0.0001. In another preferred embodiment of the invention, the ratio $K_{d2}/K_{d1}$ is approximately between 0.1 to 0.001. In another embodiment of the invention, the ratio $K_{d2}/K_{d1}$ is between approximately 0.25 and 0.5. In a preferred embodiment of the invention, the ratio $K_2/K_{d1}$ is approximately 0.33.

For a neutral preselected chemical species x, the flux equation for species x is:

$$J_x = k_x(A_{x,S}/K_{x,F})A_{x,S})$$

where $J_x$ is the flux of the preselected ion through the liquid membrane; $k_x$ is the mass transfer coefficient of the preselected species and is a direct function of the diffusivity of the preselected species in the carrier liquid and the membrane porosity and an inverse function of the membrane thickness and tortuosity; $A_{x,F}$ is the activity coefficient of species on the feed side of the liquid membrane structure; $A_{x,S}$ is the activity coefficient of species x on the strip side of the liquid membrane structure; $K_{x,S}$ is the activity coefficient of species x in the strip liquid interface divided by its activity coefficient on the strip side of the liquid membrane structure; and $K_{x,F}$ is the activity coefficient of species x in the feed solution interface divided by its activity coefficient on the feed side of the liquid membrane structure. From this equation it is readily apparent that one can control the flux of the preselected species by increasing the concentration of species x in the liquid membrane on the feed side or at the bulk interface on the strip side of the membrane. Alternatively one can decrease the concentration of species x at the bulk interface on the feed side of the liquid membrane or in the liquid membrane on the strip side.

For ionic co-transfer, the flux equation can be written as:

$$J_x = k_x(A_{x,F}A_{cx,F} - (K_{x,S}/K_{x,F})A_{x,S}A_{cx,S})$$

where x is the preselected ionic species and cx is the oppositely charged ion that is co-transported to maintain charge neutrality. One may obtain an uphill transfer of species x against its concentration gradient by decreasing the concentration of the oppositely charged ion on the strip side to such a point that the concentration difference between the feed and strip side for the oppositely charged ion is greater than for the preselected species even though there is a greater concentration of preselected species x on the strip side than on the feed side of the membrane. That is, species x will transport against its concentration gradient so long as the concentration difference between the oppositely charged ion is greater than the concentration difference between the selected species going in the uphill direction. The concentration of the oppositely charged ion must be greater on the feed side than on the strip side and that concentration difference must be greater than the concentration difference between the preselected species on the strip side to that on the feed side.

As yet a further possibility and as noted previously, one can control further the flux of the preselected species by increasing the concentration of species x in the liquid membrane on the feed side or at the bulk interface on the strip side of the membrane. Alternatively or in combination, one can decrease the concentration of species x at the bulk interface on the feed side of the liquid membrane or in the liquid membrane on the strip side.

For ionic counter-transfer, the flux equation can be written as:

$$J_x = K_x(A_{x,F}A_{cx,S} - (K_{x,S}/K_{x,F})A_{x,S}A_{cx,F})$$

where x is the preselected ionic species and cx is the oppositely charged ion that is countertransported to maintain charge neutrality. One may obtain an uphill transfer of species x against its concentration gradient by decreasing the concentration of the oppositely charged ion on the strip side to such a point that the concentration difference between the strip and feed side for the oppositely charged ion is greater than for the preselected species even though there is a greater concentration of preselected species x on the strip side than on the feed side of the membrane. That is, species x will transport against its concentration gradient so long as the concentration difference between the oppositely charged ion is greater than the concentration difference between the selected species going in the uphill direction. The concentration of the oppositely charged ion must be greater on the strip side than on the feed side and that concentration difference must be greater than the concentration difference between the preselected species on the strip side to that on the feed side.

As yet a further possibility and as noted previously for neutral and cotransport, one can control further the flux of the preselected species by increasing the concentration of species x in the liquid membrane on the feed side or at the bulk interface on the strip side of the membrane. Alternatively or in combination, one can decrease the concentration of species x at the bulk interface on the feed side of the liquid membrane or in the liquid membrane on the strip side.

FIGS. 5-8 illustrate a module for carrying out supported liquid membrane separation using hollow fibers with multiple and parallel strip liquid flows. The device generally designated as 100 comprises cylinder 104 with a first end 130 and a second end 150. Inlets 110, 106, 112, and 114 and outlets 152, 154, 156, and 158 are provided for feed solution 32 and strip solutions 34, 35, and 39, respectively. Inlet manifold 101 and outlet manifold 160 are provided for maintaining the feed solution 32 and strip liquids 34, 35, and 39 as separate flows. The inlet manifold 101 is formed from plate 132, a circular divider 170, and wall dividers 172, 174, and 176. The dividers 170, 172, 174, 176, plate 132 and end 130 form impermeable cells 102, 103, 105, 107 that maintain and separate each of the fluids 32, 34, 35 and 39. A similar arrangement of dividers (not shown) is used in conjunction with plate 134 and end 150 to provide cells that maintain separate outlet flows of feed solution 32 and strip liquids 34, 35, and 39.

Figure 5:
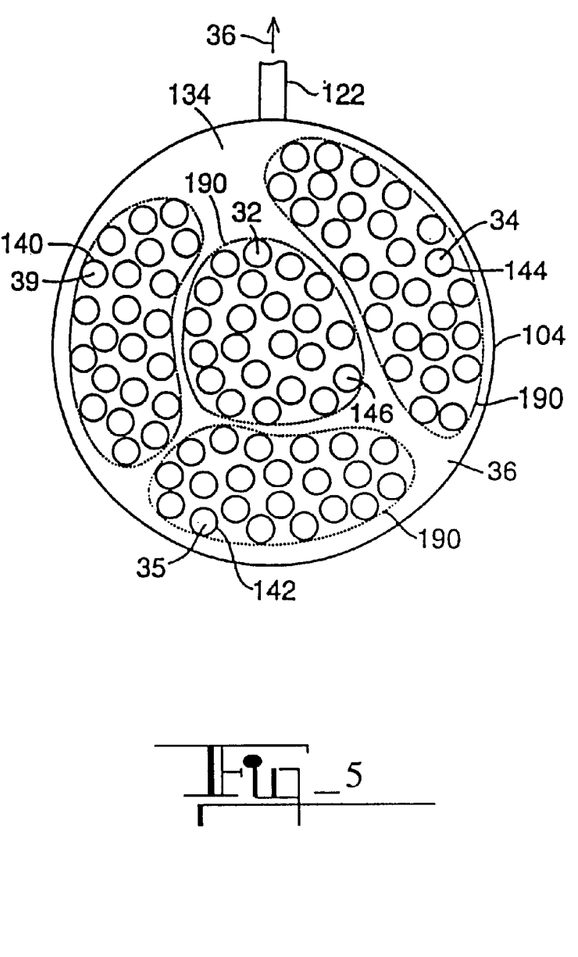
FIG. 5 is a cross sectional view of the embodiment shown in FIG. 4 taken along line 6—6.
Figure 6:
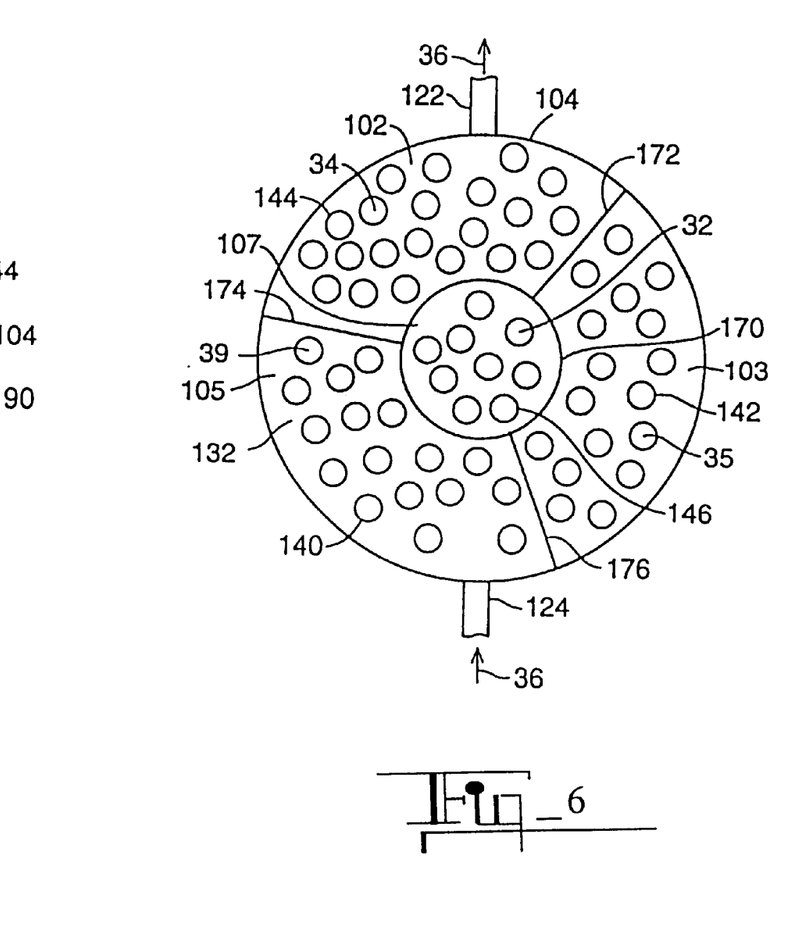
FIG. 6 is a cross sectional view of the embodiment shown in FIG. 4 taken along line 7—7.

As shown in FIG. 5, bundles of hollow fibers are provided to each of the cells 102, 103, 105 and 107 typically by forming plates 132 and 134 with epoxy cement and imbedding the hollow fibers so that the interior of each fiber is open to the appropriate cell. As shown in FIGS. 5 and 6, the interior of fibers 140, 142, 144, and 146 are open to and convey feed solution 32, and strip liquids, 34, 35, and 39, respectively through chamber 180 after which the hollow fibers are sealed to a set of similarly situated outlet cells at the opposite end of chamber 180.

One of more open screens such as screen 190 (FIG. 6) may be used to provide support to the various bundles of hollow fibers. To improve the flux of the carrier complex, the groups of fibers can be formed into fabric and spirally or helically wound about a central core in chamber 180. Baffles and other flow diverters can be provided to increase the flow path of the carrier liquid 36 through chamber 180.

In operation, a cross flow of carrier liquid 36 enters at the bottom of chamber 180 through inlet 124 and flows over and around the exterior of the hollow fiber tubes 140, 142, 144, and 146 in chamber 180 and leaves though outlet 122. The carrier liquid 36 fills the micropores of all of these tubes. The feed solution 32 enters into the circular chamber defined by circular partition 170 through inlet 110 and then flows through the interior of microporous hollow fibers 146 where it contacts the carrier liquid 36 in the micropores of hollow fibers 146. The preselected chemical species form complexes with the carrier and are transported to the pores of the hollow fibers 140, 142, and 144 carrying the strip liquids 34, 35 and 39. The strip liquids 34, 35, and 39 flowing on the inside of hollow fibers 140, 142, and 144 contact the carrier liquid in the micropores of the hollow fibers and each removes (decomplexes) one or more different preselected chemical species from the complexes in the carrier liquid 36.

This invention is further illustrated by the following examples, which are not to be construed in any way as imposing limitations upon the scope thereof. On the contrary, it is to be clearly understood that resort may be had to various other embodiments, modifications, and equivalents thereof, which, after reading the description herein, may suggest themselves to those skilled in the art without departing from the spirit of the present invention.

Example 1

An initial feed of 300 parts per million (ppm) chromium (VI) was extracted using a carrier liquid having a 33 vol% Amberlite L-A2 carrier (N-dodecyltrialkylmethylamine), i.e., an ion exchange resin, and a diluent of pure dodecane (67 vol%). This carrier liquid of Amberlite carrier and dodecane diluent had a dielectric constant of approximately 15 and afforded a flux of less than 1 g $m^2$/hr. The stability of the membrane was relatively high, lasting for approximately 16 days. When 1 vol% nitrophenyl octyl ether was added to the carrier liquid (33% Amberlite carrier, 66% dodecane diluent and 1% nitrophenyl octyl ether), the resulting dielectric constant was approximately 20 and the flux had increased by a factor of 1.6. The general stability was about the same as the pure dodecane diluent. When a 5% solution of nitrophenyl octyl ether was used (33% Amberlite, 62% dodecane, and 5% nitrophenyl octyl ether), the overall dielectric constant of the carrier liquid increased to approximately 24 while the flux increased by a factor of 2.6 times over that of the pure dodecane diluent. The membrane was stable for approximately 18 days. When a 10 vol% nitrophenyl octyl ether solution with 57 vol% dodecane, and 33 vol% Amberlite was used, the flux increased by a factor of 4 times with the dielectric constant increasing to about 28. The membrane was stable for approximately 3 weeks. Finally, when pure nitrophenyl octyl ether was used in place of the dodecane, the resulting Amberlite and nitrophenyl octyl ether solution had a dielectric constant of more than 30 and provided the greatest flux; however the membrane was stable for less than a day.

Example 2

Similar results were obtained for nickel or zinc at an initial feed concentration of 300 ppm and a carrier liquid having a 30 vol% bis(2-ethylhexyl) hydrogen phosphate carrier and a diluent mixture of 60–70 vol% dodecane and 0–10 vol% of nitrophenyl octyl ether. The resulting carrier liquid had a dielectric constant of about 10 to about 15 and afforded a flux of less than about 1 $gm^2$/hr. The membrane was stable for about 2 to about 3 days. With the carrier concentration held constant, the nitrophenyl octyl ether concentration was increased to about 40 vol% to about 70 vol% and the dodecane lowered to about 0 vol% to about 30 vol%, to afford a dielectric constant of about 30 to about 40. Such carrier liquid afforded an increase of flux of about two times that of the flux with a 10% nitrophenyl octyl ether diluent, and the membrane was stable for about 15 days.

Example 3

When a nitrophenyl octyl ether concentration of about 10 vol% to about 30 vol% and a 40 vol% to about 60 vol% dodecane solution was used, the dielectric constant of the carrier liquid was approximately 20–28, and a flux of 6 to 8 times that of the flux using a 10% nitrophenyl octyl ether solution was achieved. The membrane was stable for approximately 10 to 15 days.

Example 4

A 200 ppm silver feed solution was extracted with a carrier of diethylsulfide. The diethylsulfide carrier was maintained at a concentration of 10% in the carrier liquid. When nitrophenyl octyl ether was used alone with the carrier, the dielectric constant of the resulting carrier liquid was approximately 24, and afforded a flux of more than 3 gm²/hr. The membrane was stable for more than 35 days. When dodecane (90%) was substituted for the nitrophenyl octyl ether, the dielectric constant was approximately 10 and the flux was less than 1 gm²/hr. Furthermore, the membrane was stable for less than 2 days.

Example 5

In this Example, the separation of hexavalent chromium from an acid feed solution using a carrier liquid employing an amine carrier is shown. In the first step of the reaction, the feed chromium reacts with the amine to form an amine complex, ie., $H_2CrO_4 + 2NaOH\ H_2(Amine)_2CrO_4 + Heat$.

On the strip side of the process, the chromium reacts with a base in another exothermic reaction, i.e., $2H_2CrO_4 + 2NaOH\ Na_2Cr_2O_7 + 2H_2O + Heat$.

Since both the first and second reactions liberate heat and the greatest concentration of chromium ion is in the carrier liquid, cooling of the carrier liquid is a more efficient process than cooling either the feed liquid or strip liquid or both, since only a small volume of liquid needs to be cooled. The feed and strip liquid volumes are much larger than that of the carrier liquid.

Example 6

A supported liquid membrane device was established with a feed solution containing 50 ppm $Na^+TcO_4^-$, and a strip solution containing 100 ppm $Na^+TcO_4^-$. An ion exchange column was used to remove Na+ from the strip solution, and replace it with $Mg^{2+}$. During the course of the experiment, the concentration of $TcO_4^-$ increased to 110 ppm, then 120 ppm, and continued to increase.

Those skilled in the art will now see that certain modifications can be made to the invention herein disclosed with respect to the illustrated embodiments, without departing from the spirit of the instant invention. And while the invention has been described above with respect to the preferred embodiments, it will be understood that the invention is adapted to numerous rearrangements, modifications, and alterations, all such arrangements, modifications, and alterations are intended to be within the scope of the appended claims.

We claim:

1. A process for separating a large anion from a mixture of said large anion and smaller anions in a feed solution, said process comprising:

a. providing an aqueous feed solution having a mixture of a large anion and at least one other smaller anion;

b. providing an aqueous strip liquid;

c. providing a microporous liquid membrane support member;

d. providing a solution of a crown ether carrier in a diluent with said solution filling the pores of said microporous liquid membrane support member to form a supported liquid membrane and being immiscible with said feed solution and said strip liquid;

f. contacting said feed solution with a first side of said supported liquid membrane support member;

g. forming a carrier complex from a cation, said crown ether carrier and said associated large anion;

h. moving said complex from said first side of said liquid membrane to a second side of said liquid membrane;

i. contacting with said second side of said liquid membrane with said strip liquid;

j. disassociating said cation, said crown ether carrier and said associated large anion; and k. removing at least a portion of said large anion from said supported liquid membrane into said strip liquid.

* * * * *